(12) United States Patent
Kozachenok et al.

(10) Patent No.: US 11,532,153 B2
(45) Date of Patent: Dec. 20, 2022

(54) SPLASH DETECTION FOR SURFACE SPLASH SCORING

(71) Applicant: Ecto, Inc., Atlanta, GA (US)

(72) Inventors: Dmitry Kozachenok, Atlanta, GA (US); Ming Chen, Atlanta, GA (US); Pablo Valdes Donoso, Atlanta, GA (US); David Israel Machovec, Atlanta, GA (US); Allen Torng, Atlanta, GA (US)

(73) Assignee: Ecto, Inc., Atlanta, GA (US)

( * ) Notice: Subject to any disclaimer, the term of this patent is extended or adjusted under 35 U.S.C. 154(b) by 0 days.

(21) Appl. No.: 16/920,813

(22) Filed: Jul. 6, 2020

(65) Prior Publication Data

US 2022/0004760 A1 Jan. 6, 2022

(51) Int. Cl.
*G06V 20/00* (2022.01)
*G06V 40/10* (2022.01)

(52) U.S. Cl.
CPC ............ *G06V 20/00* (2022.01); *G06V 40/103* (2022.01)

(58) Field of Classification Search
CPC ................. G06K 9/00624; G06K 9/00369
See application file for complete search history.

(56) References Cited

U.S. PATENT DOCUMENTS

| 5,732,655 A | * | 3/1998 | Baba ..................... A01K 61/80 |
| | | | 119/230 |
| 10,856,520 B1 | * | 12/2020 | Kozachenok .......... G06N 20/20 |
| 2013/0179511 A1 | * | 7/2013 | Stevens ................. H04L 67/306 |
| | | | 709/204 |
| 2013/0206078 A1 | * | 8/2013 | Melberg ................ A01K 61/80 |
| | | | 119/230 |
| 2016/0120157 A1 | * | 5/2016 | Vrehen ................. F21V 23/003 |
| | | | 119/267 |
| 2017/0325427 A1 | * | 11/2017 | Straight ................. A01G 31/06 |
| 2018/0059230 A1 | * | 3/2018 | Snyder .................. G01S 7/6272 |
| 2019/0021292 A1 | * | 1/2019 | Hayes .................... H04N 7/188 |
| 2020/0104602 A1 | * | 4/2020 | Atwater ............. G06K 9/00771 |
| 2020/0113158 A1 | * | 4/2020 | Rishi ..................... A01K 61/10 |

* cited by examiner

Primary Examiner — Ming Y Hon (57) ABSTRACT

A method of surface splash scoring includes receiving, at an electronic device, a set of camera frames corresponding to images of a water surface. The electronic device processes the set of camera frames with a trained machine learning model to generate one or more quantifications associated with fish activity proximate the water surface. In some embodiments, a surface splash score is computed that represents an appetite level anticipated to be exhibited for a first time period. Subsequently, the electronic device generates an output indicative of the surface splash score.

20 Claims, 6 Drawing Sheets

SPLASH DETECTION FOR SURFACE SPLASH SCORING

BACKGROUND

Husbandry, such as in agriculture and aquaculture, includes raising animals for their meat, fiber, milk, eggs, or other products. Animal feed, such as fodder and forage, generally refers to food given to animals. Fodder refers particularly to foods or forages given to animals, rather than that which the animals forage for themselves. Fodder includes grains, silage, compressed and pelleted feeds, oils and mixed rations, and the like. Extensively reared animals may subsist entirely or substantially on forage, but more intensively reared animals will typically require additional energy and protein-rich foods, such as fodder, in addition to wild forage.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

In animal husbandry, farmers aim for the highest growth rates possible while using the least amount of feed to produce a desired output. Typically, aquaculture refers to the cultivation of fish, shellfish, aquatic species, and the like through husbandry efforts for seafood markets and human consumption. With respect to aquatic animals raised for meat (e.g., fish), the desired output is flesh/meat. For example, fish are usually fed a diet of pelleted food and grains to increase the mass of the resulting farmed fish. As feeding costs contribute 30% or more as a proportion of total production expenses, feeding management is therefore one of the more important aspects of aquaculture.

Feeding management efficiency regarding feeding rate, amount, frequency, and timing should be adjusted to avoid both over- and under-feeding. Underfeeding, in particular, can result in a detrimental effect to the growth of fish due to reduced growth rates. Overfeeding can also result in detrimental effects to the growth of fish due to digestive system overload, which leads to a decrease in digestive efficiency and feed utilization. Overfeeding also reduces profitability due to waste of feed (e.g., particularly with open- or semi-open systems in aquatic environments where uneaten feed does not sit around, as it might with terrestrial farming, but instead gets washed away and therefore wasted). Further, overfeeding may negatively impact farm operations by deteriorating water quality due to pollution and/or affecting the health of fish by weakening immune systems and increasing susceptibility to infections, which decreases product yields due to increased mortality rates.

Aquaculture companies have conventionally implemented deficient strategies for increasing feeding management efficiency. Such strategies include, for example, the hiring of employees to perform feeding-related functions based at least in substantial part based on visual determinations of fish activity for appetite identification. As will be appreciated, visual determinations made by individual employees result in undesirable variations in performance, both in terms of variable performance amongst different individuals and whose individual performances are also likely variable on a day-to-day basis. Further, the performance of such manual processes and human-based appetite identifications will have inherent uncertainties in their performance due to the uncertainty of detecting changes in appetite of fish and further by nature of the environments in which they are deployed.

Aquaculture stock is, with few exceptions, often held underwater and therefore more difficult to observe than animals and plants cultured on land. Further, aquaculture is commonly practiced in open, outdoor environments and therefore exposes farmed animals, farm staff, and farming equipment to factors that are, at least partially, beyond the control of operators. Such factors include, for example, variable and severe weather conditions, changes to water conditions, dissolved oxygen levels, turbidity, interference with farm operations from predators, and the like. Manual processes of observing animal activity and estimating characteristics, such as appetite, is often time-consuming, inaccurate, highly variable between different individuals, and is further associated with various limitations such as decreased accessibility and observability during certain times of the day or during adverse weather conditions. Consequently, there is a need to improve the efficiency and accuracy of feeding appetite determination and feeding strategies.

To improve the precision and accuracy of feeding appetite identification and decreasing the uncertainties associated with conventional appetite determination, FIGS. 1-6 describe techniques for utilizing image sensor systems to monitor fish activity, such as to identify hunger levels and determine behavior during feeding. In various embodiments, images captured by the image sensor systems are provided as inputs to a trained appetite forecast model for generating one or more quantifications associated with observable fish activity. In various embodiments, a method of surface splash scoring includes receiving, at an electronic device, a set of camera frames corresponding to images of a water surface. The electronic device processes the set of camera frames with a trained machine learning model to generate one or more quantifications associated with fish activity proximate the water surface. In some embodiments, a surface splash score is computed that represents an appetite level anticipated to be exhibited for a first time period. In various embodiments, the surface splash score includes an appetite descriptor is generated based at least in part on the one or more quantifications. Subsequently, the electronic device generates an output indicative of the surface splash score.

In this manner, the techniques described here provide an efficient manner for farmers to generate one or more quantifications associated with observable fish activity as appetite proxies to improve feeding and the results of aquaculture operations and further determine an amount of feed required in order to reach satiation for fish populations. For example, surface splash scoring enables more efficient scheduling of feeding times and/or quantity of feed in order to minimize waste while also increasing growth rates by feeding when activity levels indicate hunger and willingness to consume feed. Further, analysis of fish splash behavior prior to feeding allows determination of when to start and/or stop feeding without human input and/or reduces error resulting from differential human, experiential-based assessments of hunger.

Figure 1:
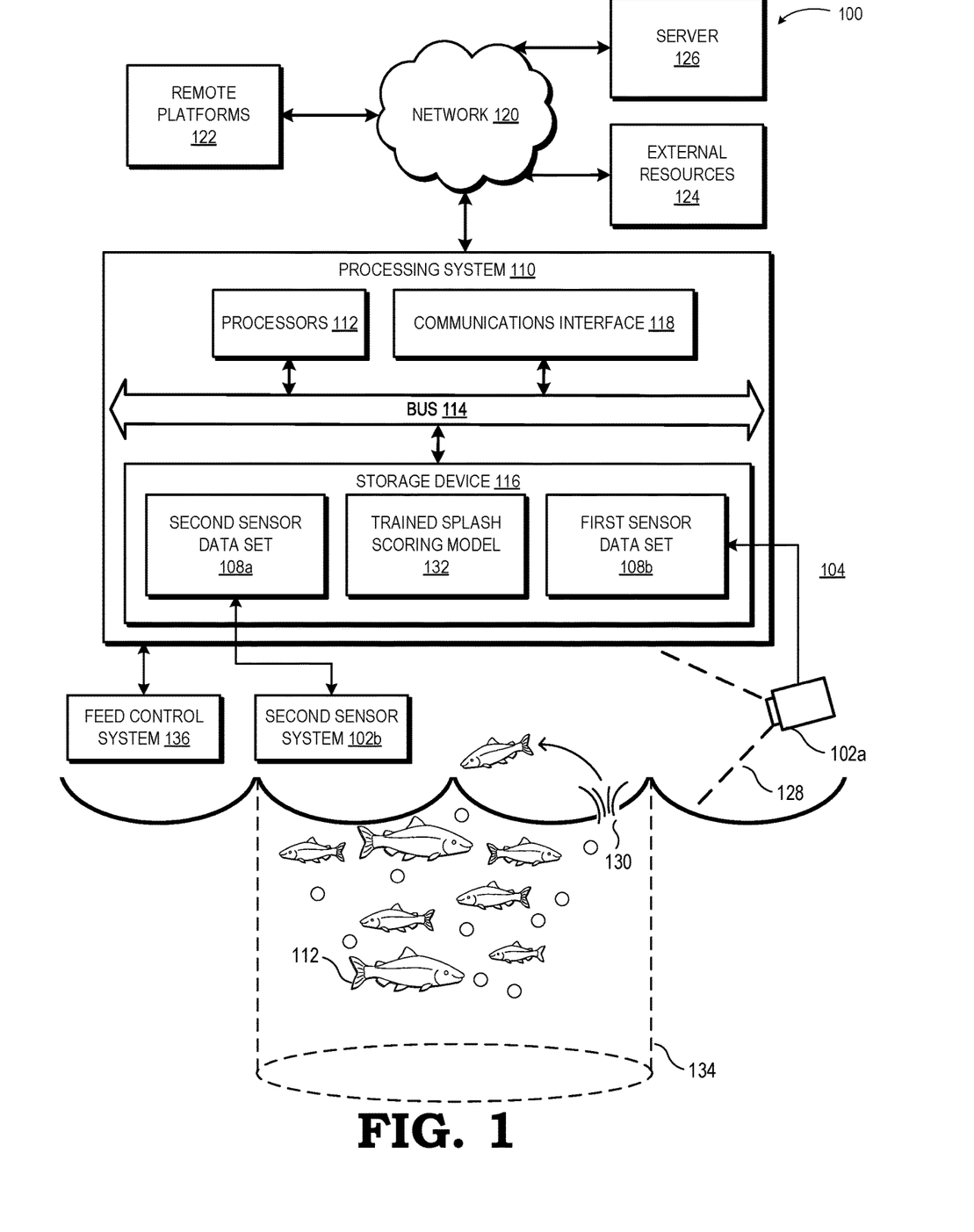
FIG. 1 is a diagram illustrating a system for implementing image-based surface splash scoring in accordance with some embodiments.

FIG. 1 is a diagram of a system 100 for implementing image-based surface splash scoring in accordance with some embodiments. In various embodiments, the system 100 includes a plurality of sensor systems 102 that are each configured to monitor and generate data associated with the environment 104 within which they are placed. In general, the plurality of sensor systems 102 measure and convert physical parameters such as, for example, moisture, heat, motion, light levels, and the like to analog electrical signals and/or digital data.

As shown, the plurality of sensor systems 102 includes a first image sensor system 102a positioned at or above the water surface 106 for monitoring the environment 104 proximate to and above the water surface 106 (e.g., at the water surface or even slightly underwater if the image sensors are capable of capturing sub-subsurface details). In various embodiments, the first image sensor system 102a generates data associated with one or more feeding parameters, such as represented within an image data set 108a. It will be appreciated that feeding parameters, in various embodiments, include one or more parameters corresponding to the environment 104 within which the one or more sensors are positioned and may be measured (or otherwise captured and detected) to generate data sets to be used in appetite forecasting models. Accordingly, in various embodiments, the first sensor system 102a generates an image data set 108a and communicates the image data set 108a to a processing system 110 for storage, processing, and the like.

In various embodiments, the first image sensor system 102a includes one or more imaging sensors configured to observe fish behavior and capture measurements associated with feeding parameters related to fish appetite. For example, in some embodiments, the imaging sensors are configured to capture image data corresponding to, for example, the presence (or absence), abundance, distribution, size, and behavior of objects (e.g., a population of fish 112 as illustrated in FIG. 1) in the environment 104. Such image data measurements may therefore be used to identify fish activity for approximation of appetite, for use in forecasting models, and the like. It should be recognized that although the feeding parameter has been abstracted and described here generally as "image data" for ease of description, those skilled in the art will understand that image data (and therefore the feeding parameters corresponding to the image data) may include, but is not limited to, any of a plurality of image frames, quantifications of image features detected within image data, extrinsic parameters defining the location and orientation of the image sensors, intrinsic parameters that allow a mapping between camera coordinates and pixel coordinates in an image frame, camera models, operational parameters of the image sensors (e.g., shutter speed), depth maps, and the like.

As used herein, it should be appreciated that an "object" refers to any stationary, semi-stationary, or moving object, item, area, or environment in which it may be desired for the various sensor systems described herein to acquire or otherwise capture data of. For example, an object may include, but is not limited to, one or more fish, crustacean, feed pellets, parasites, predatory animals, water splashes, and the like. However, it should be appreciated that the sensor measurement acquisition and analysis systems disclosed herein may acquire and/or analyze sensor data regarding any desired or suitable "object" in accordance with operations of the systems as disclosed herein. Further, it should be recognized that although specific sensors are described below for illustrative purposes, various imaging sensors may be implemented in the systems described herein without departing from the scope of this disclosure.

As will be appreciated, a variable parameter such as variance in environmental conditions may affect the accuracy of image-based measurements and accordingly the accuracy of prediction models that consume such images as input. Accordingly, in some embodiments, the plurality of sensor systems 102 also includes an environmental sensor system 102b configured to monitor the environment (e.g., environment 104) within which it is positioned and generate data associated with an environmental parameter. For example, in one embodiment, the environmental sensors of the environmental sensor system 102b includes an ambient light sensor or other photodetector configured to sense or otherwise measure an amount of ambient light present within the environment local to the sensor. As described in further detail below, in various embodiments, the ambient light sensor of the environmental sensor system 102b generate environmental data that serves as reference data for implementing the surface splash scoring with respect to feeding appetite forecast models. It should be recognized that although FIG. 1 is described in the specific context of an ambient light sensor, the environmental sensor system 102b may include any number of and any combination of various environmental sensors without departing from the scope of this disclosure.

Environmental data generated by the environmental sensor system 102b may include any measurement representative of the environment 104 within which the environmental sensors are deployed. For example, the environmental data (and therefore the environmental data set 108b corresponding to the environmental data) may include, but is not limited to, any of a plurality of water turbidity measurements, water temperature measurements, metocean measurements, weather forecasts, air temperature, dissolved oxygen, current direction, current speeds, and the like. Further, the environmental parameters and environmental data may include any combination of present, past, and future (e.g., forecasts) measurements of meteorological parameters (e.g., temperature, wind speed, wind direction), water environment parameters (e.g., water temperature, current speed, current direction, dissolved oxygen levels, turbidity levels), air environment parameters, other environmental parameters, and the like.

It should be recognized that although surface splash scoring is described here primarily in the context of above-water image sensors and above-water environmental sensors, data may be collected by any of a variety of imaging and non-imaging sensors. By way of non-limiting examples, in various embodiments, the sensor systems may include various sensors local to the site at which the fish are located (e.g., underwater telemetry devices and sensors), sensors remote to the fish site (e.g., satellite-based weather sensors such as scanning radiometers), various environmental monitoring sensors, active sensors (e.g., active sonar), passive sensors (e.g., passive acoustic microphone arrays), echo sounders, photo-sensors, ambient light detectors, accelerometers for measuring wave properties, salinity sensors, thermal sensors, infrared sensors, chemical detectors, temperature gauges, or any other sensor configured to measure data that would have an influence on feeding appetite. It should be further recognized that, in various embodiments, the sensor systems utilized herein are not limited to above-water sensors and may include combinations of a plurality of sensors at different locations. It should also be recognized that, in various embodiments, the sensor systems utilized herein are not limited to sensors of differing parameter types. For example, in various embodiments, the sensor systems may include two different image-data based sensor systems positioned at different locations (e.g., under water and above water) and/or a plurality of differing environmental sensors.

Accordingly, in various embodiments, the processing system 110 receives one or more of the data sets 108 (e.g., image data set 108a and the environmental data set 108b) via, for example, wired-telemetry, wireless-telemetry, or any other communications link for processing, storage, and the like. The processing system 110 includes one or more processors 112 coupled with a communications bus 114 for processing information. In various embodiments, the one or more processors 112 include, for example, one or more general purpose microprocessors or other hardware processors. The processing system 110 also includes one or more storage devices 116 communicably coupled to the communications bus 114 for storing information and instructions. For example, in some embodiments, the one or more storage devices 116 includes a magnetic disk, optical disk, or USB thumb drive, and the like for storing information and instructions.

In various embodiments, the one or more storage devices 116 also includes a main memory, such as a random-access memory (RAM), cache and/or other dynamic storage devices, coupled to the communications bus 114 for storing information and instructions to be executed by the one or more processors 112. The main memory may be used for storing temporary variables or other intermediate information during execution of instructions to be executed by the one or more processors 112. Such instructions, when stored in storage media accessible by the one or more processors 112, render the processing system 110 into a special-purpose machine that is customized to perform the operations specified in the instructions. By way of non-limiting example, in various embodiments, the processing system 110 may be any computer system, such as a workstation, desktop computer, server, laptop, handheld computer, tablet computer, mobile computing or communication device, or other form of computing or telecommunications device that is capable of communication and that has sufficient processor power and memory capacity to perform the operations described herein.

The processing system 110 also includes a communications interface 118 communicably coupled to the communications bus 114. The communications interface 118 provides a multi-way data communication coupling configured to send and receive electrical, electromagnetic or optical signals that carry digital data streams representing various types of information. In various embodiments, the communications interface 118 provides data communication to other data devices via, for example, a network 120. Users may access system 100 via remote platform(s) 122. For example, in some embodiments, the processing system 110 may be configured to communicate with one or more remote platforms 122 according to a client/server architecture, a peer-to-peer architecture, and/or other architectures via the network 120. The network 120 may include and implement any commonly defined network architecture including those defined by standard bodies. Further, in some embodiments, the network 120 may include a cloud system that provides Internet connectivity and other network-related functions. Remote platform(s) 122 may be configured to communicate with other remote platforms via the processing system 110 and/or according to a client/server architecture, a peer-to-peer architecture, and/or other architectures via the network 120.

A given remote platform 122 may include one or more processors configured to execute computer program modules. The computer program modules may be configured to enable a user associated with the given remote platform 122 to interface with system 100 and/or external resources 124, and/or provide other functionality attributed herein to remote platform(s) 122. External resources 124 may include sources of information outside of system 100, external entities participating with system 100, and/or other resources. In some implementations, some or all of the functionality attributed herein to external resources 124 may be provided by resources included in system 100.

In some embodiments, the processing system 110, remote platform(s) 122, and/or one or more external resources 124 may be operatively linked via one or more electronic communication links. For example, such electronic communication links may be established, at least in part, via the network 120. It will be appreciated that this is not intended to be limiting, and that the scope of this disclosure includes implementations in which the processing system 110, remote platform(s) 122, and/or external resources 124 may be operatively linked via some other communication media. Further, in various embodiments, the processing system 110 is configured to send messages and receive data, including program code, through the network 120, a network link (not shown), and the communications interface 118. For example, a server 126 may be configured to transmit or receive a requested code for an application program through via the network 120, with the received code being executed by the one or more processors 112 as it is received, and/or stored in storage device 116 (or other non-volatile storage) for later execution.

In various embodiments, the imaging sensors of the first image sensor system 102a includes one or more cameras configured to capture still images and/or record moving images (e.g., video data). The one or more cameras may include, for example, one or more video cameras, photographic cameras, stereo cameras, or other optical sensing devices configured to capture imagery. The one or more cameras are directed towards the surrounding environment 104 (e.g., facing the water surface 106), with each camera capturing a sequence of images (e.g., video frames) of the environment 104 and any objects in the environment. In various embodiments, each camera has a different viewpoint or pose (i.e., location and orientation) with respect to the environment. Although FIG. 1 only shows a single camera for ease of illustration and description, persons of ordinary skill in the art having benefit of the present disclosure should appreciate that the first image sensor system 102a can include any number of cameras and which may account for parameters such as each camera's horizontal field of view, vertical field of view, and the like. Further, persons of ordinary skill in the art having benefit of the present disclosure should appreciate that the first image sensor system 102a can include any arrangement of cameras (e.g., cameras positioned on different planes relative to each other, single-plane arrangements, spherical configurations, and the like).

In some embodiments, the imaging sensors of the first image sensor system 102a includes a first camera (or lens) having a particular field of view 128 as represented by the dashed lines that define the outer edges of the camera's field of view that images the environment 104 or at least a portion thereof. For the sake of clarity, only the field of view 128 for a single camera is illustrated in FIG. 1. In various embodiments, the imaging sensors of the first image sensor system 102a includes at least a second camera having a different but overlapping field of view (not shown) relative to the first camera (or lens). Images from the two cameras therefore form a stereoscopic pair for providing a stereoscopic view of objects in the overlapping field of view. Further, it should be recognized that the overlapping field of view is not restricted to being shared between only two cameras. For example, at least a portion of the field of view 128 of the first camera of the first image sensor system 102a may, in some embodiments, overlap with the fields of view of two other cameras to form an overlapping field of view with three different perspectives of the environment 104.

In some embodiments, the imaging sensors of the first image sensor system 102a includes one or more light field cameras configured to capture light field data emanating from the surrounding environment 104. In other words, the one or more light field cameras captures data not only with respect to the intensity of light in a scene (e.g., the light field camera's field of view/perspective of the environment) but also the directions of light rays traveling in space. In contrast, conventional cameras generally record only light intensity data. In other embodiments, the imaging sensors of the first image sensor system 102a includes one or more range imaging cameras (e.g., time-of-flight and LIDAR cameras) configured to determine distances between the camera and the subject for each pixel of captured images. For example, such range imaging cameras may include an illumination unit (e.g., some artificial light source) to illuminate the scene and an image sensor with each pixel measuring the amount of time light has taken to travel from the illumination unit to objects in the scene and then back to the image sensor of the range imaging camera.

It should be noted that the various operations are described here in the context of multi-camera or multi-lens cameras. However, it should be recognized that the operations described herein may similarly be implemented with any type of imaging sensor without departing from the scope of this disclosure. For example, in various embodiments, the imaging sensors of the first image sensor system 102a may include, but are not limited to, any of a number of types of optical cameras (e.g., RGB and infrared), thermal cameras, range- and distance-finding cameras (e.g., based on acoustics, laser, radar, and the like), stereo cameras, structured light cameras, ToF cameras, CCD-based cameras, CMOS-based cameras, machine vision systems, light curtains, multi- and hyper-spectral cameras, thermal cameras, and the like. Such imaging sensors of the first image sensor system 102a may be configured to capture, single, static images and/or also video images in which multiple images may be periodically captured. In some embodiments, the first image sensor system 102a may activate one or more integrated or external illuminators (not shown) to improve image quality when ambient light conditions are deficient (e.g., as determined by luminosity levels measured by a light sensor of the environmental sensor system 102b falling below a predetermined threshold).

In various embodiments, the processing system 110 receives one or more data sets 108 (e.g., image data set 108a and environmental data set 108b) and stores the data sets 108 at the storage device 116 for processing. In various embodiments, the data sets 108 include data indicative of one or more conditions at one or more locations at which their respective sensor systems 102 are positioned. In some embodiments, the image data set 108a includes image data indicative of, for example, movement of one or more objects, orientation of one or more objects, swimming pattern or swimming behavior of one or more objects, jumping pattern or jumping behavior of one or more objects, splashes at the water surface resulting from behavior of one or more objects, any activity or behavior of one or more objects, and the like. In some embodiments, the environmental data set 108b includes environmental data indicating environmental conditions such as, for example, an ambient light level, an amount of dissolved oxygen in water, a direction of current, a strength of current, a salinity level, a water turbidity, a topology of a location, a weather forecast, and the like.

As described in more detail below with respect to FIGS. 2-6, the processing system 110 provides at least a portion of the image data sets 108a as input to a appetite forecast model generator for generating a trained model and/or to a trained appetite forecast model (e.g., the trained forecast model 132 of FIG. 1). In various embodiments, the trained model 132 receives a data set corresponding to measurements associated with at least a first feeding parameter related to feeding appetite forecasting. By way of non-limiting example, in some embodiments, a feeding parameter describes fish position within the water below the water surface 106, the presence and presence of fish 112 at or near the water surface 106 (such as caused by jumping or swimming just below the water surface 106), splashes 130 at the water surface 106 caused by fish activity, and the like.

Although primarily discussed here in the context of aquaculture as it relates to the feeding of fish, those skilled in the art will recognize that the techniques described herein may be applied to any aquatic, aquaculture species such as shellfish, crustaceans, bivalves, finfish, and the like without departing from the scope of this disclosure. As illustrated in FIG. 1, the system 100 includes one or more enclosures 134 containing the fish 112. In various embodiments, the enclosure 134 includes a net pen system, a sea cage, a fish tank, and the like. Such enclosures 134 may include a circular-shaped base with a cylindrical structure extending from the circular-shaped base to a ring-shaped structure positioned at a water line, which may be approximately level with a top surface of the water surface 106.

In general, various configurations of an enclosure system may be used without departing from the scope of this disclosure. For example, although the enclosure 134 is illustrated as having a circular base and cylindrical body structure, other shapes and sizes, such as rectangular, conical, triangular, pyramidal, or various cubic shapes may also be used without departing from the scope of this disclosure. Additionally, although primarily illustrated and discussed here in the context of fish being positioned in an open water environment (which will also include an enclosure 134 of some kind to prevent escape of fish into the open ocean), those skilled in the art will recognize that the techniques described herein may similarly be applied to any type of aquatic farming environment and their respective enclosures. For example, such aquatic farming environments may include, by way of non-limiting example, lakes, ponds, open seas, recirculation aquaculture systems (RAS) to provide for closed systems, raceways, indoor tanks, outdoor tanks, and the like.

Image data corresponding to feeding parameters may be utilized as input by the trained forecast model 132 to generate a description of a possible hunger level to be exhibited by the fish within the water for a future time period (i.e., a feeding appetite prediction). In various embodiments, the trained forecast model 132 is trained using training data including at least a portion of the data sets 108 and various machine-learning methods. The training data may include various images of fish 112 and/or images of views of the water surface 106. For example, the training data may include images of fish having varying features and properties, such as fins, tails, shape, size, color, and the like. The training data may also include images with variations in the locations and orientations of fish within each image, including images of the fish captured at various camera viewing angles. Further, in various embodiments, the training data similarly includes various images of the water surface 106 and splashes 130 with variations in the locations of splashes within each image. Additionally, the training data may include images of the water surface and splashes 130 as captured at various camera angles (e.g., from a perspective view, from a top-down view in which the focal plane of one or more imaging sensors are positioned substantially parallel to the water surface 106, a side view in which the focal plane of one or more imaging sensors are positioned substantially perpendicular to the water surface 106, and the like).

In various embodiments, such as described below in more detail with respect to FIG. 2, the processing system 110 generates, based at least in part on the training and subsequent usage of the trained forecast model 132, one or more quantifications representing activity at or near the water surface 106. In this manner, the trained forecast model 132 utilizes image data related to various feeding parameters to generate one or more quantifications as a proxy for appetite (as appetite is a value which cannot be directly measured and therefore must be inferred). In various embodiments, the one or more quantifications are included in determination of a surface splash score as a descriptor of a possible hunger level to be exhibited by the population of fish 112 within the water for a future time period (i.e., a feeding appetite prediction).

Further, in various embodiments, such as described below in more detail with respect to FIG. 2, the one or more quantifications generated by the trained forecast model 132 is represented as a numerical value. However, those skilled in the art will recognize that such numerical representations of appetite and appetite prediction is provided as a non-limiting example for ease of illustration. As used herein, the term "feeding appetite forecast" refers to any representation (e.g., including both quantitative and qualitative) or other description of a parameter (which may be based on sensor measurements, derived from sensor measurements, input based on human observations, and the like).

Figure 3:
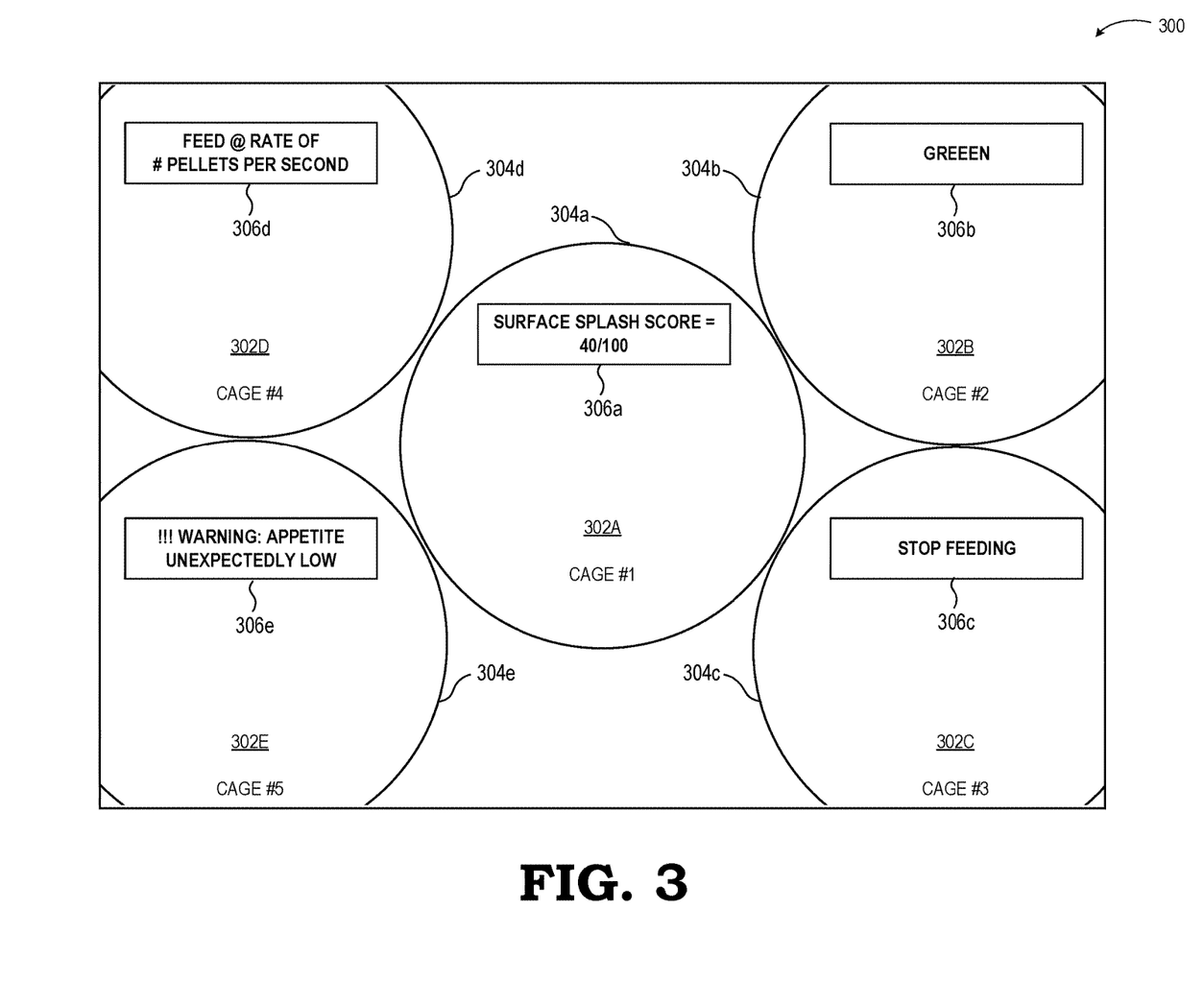
FIG. 3 is a diagram showing an example graphical user interface (GUI) for presenting information related to surface splash scores in accordance with some embodiments.

Additionally, it should be recognized that a "feeding appetite forecast" may also include (model-based-output or otherwise) a raw numerical quantification without any relation to a baseline reference (e.g., raw number of splashes and/or fish visible jumping out of water), a color-coded descriptor (e.g., feeding appetite forecast 302*b*), a percentage quantification of total biomass positioned at a location within the water that is indicative of hunger (e.g., biomass within an upper ⅓ of sea cage volume), instructions to change feeding rate or total amount (e.g., feeding appetite forecast 302*c*), and the like.

Further, it should be noted that although the various operations are primarily described here in the context of forecasting (or predicting) appetite for a future time period, the operations described herein may similarly be applied to description for a prior time period or description of a feeding appetite metric in real-time (i.e., for a current time period) without departing from the scope of this disclosure. Accordingly, as used herein, a "forecast" or "prediction" (e.g., in the context of feeding) refers to describing, either qualitatively or quantitatively, any proxy related to estimated level of appetite (or in the inverse, satiation), as appetite levels are generally not directly quantifiable or otherwise measurable in discrete unit terms (unlike, for example, temperature or humidity which have conventional units of measurement).

As described in more detail below with respect to FIGS. 2-6, by observing fish behavior via machine/computer vision and processing the captured imagery using a trained forecast model to generate one or more quantifications associated with fish activity proximate the water surface, the system 100 is able to more objectively and accurately quantify fish activity as a measure of appetite in an advantageous way. The resulting surface splash score therefore indicates for multiple feeding parameters and may have an improved prediction accuracy. For example, using multiple image-based quantifications of fish activity and computing a surface splash score based on such quantifications provides for an appetite forecast with an increased accuracy (and also at a lesser human capital cost) relative to human-based observations or experiential determinations. Further, the computed surface splash score may further be used as the basis for generating one or more outputs for aiding feeding operations, including but not limited to feeding instructions, user interface alerts, and the like. In various embodiments, such outputs related to the surface splash score may be provided, for example, as feeding instructions to a feed controller system 136 for controlling the operations (e.g., dispensing of feed related to meal size, feed distribution, meal frequency, feed rate, etc.) of automatic feeders, feed cannons, and the like.

Figure 2:
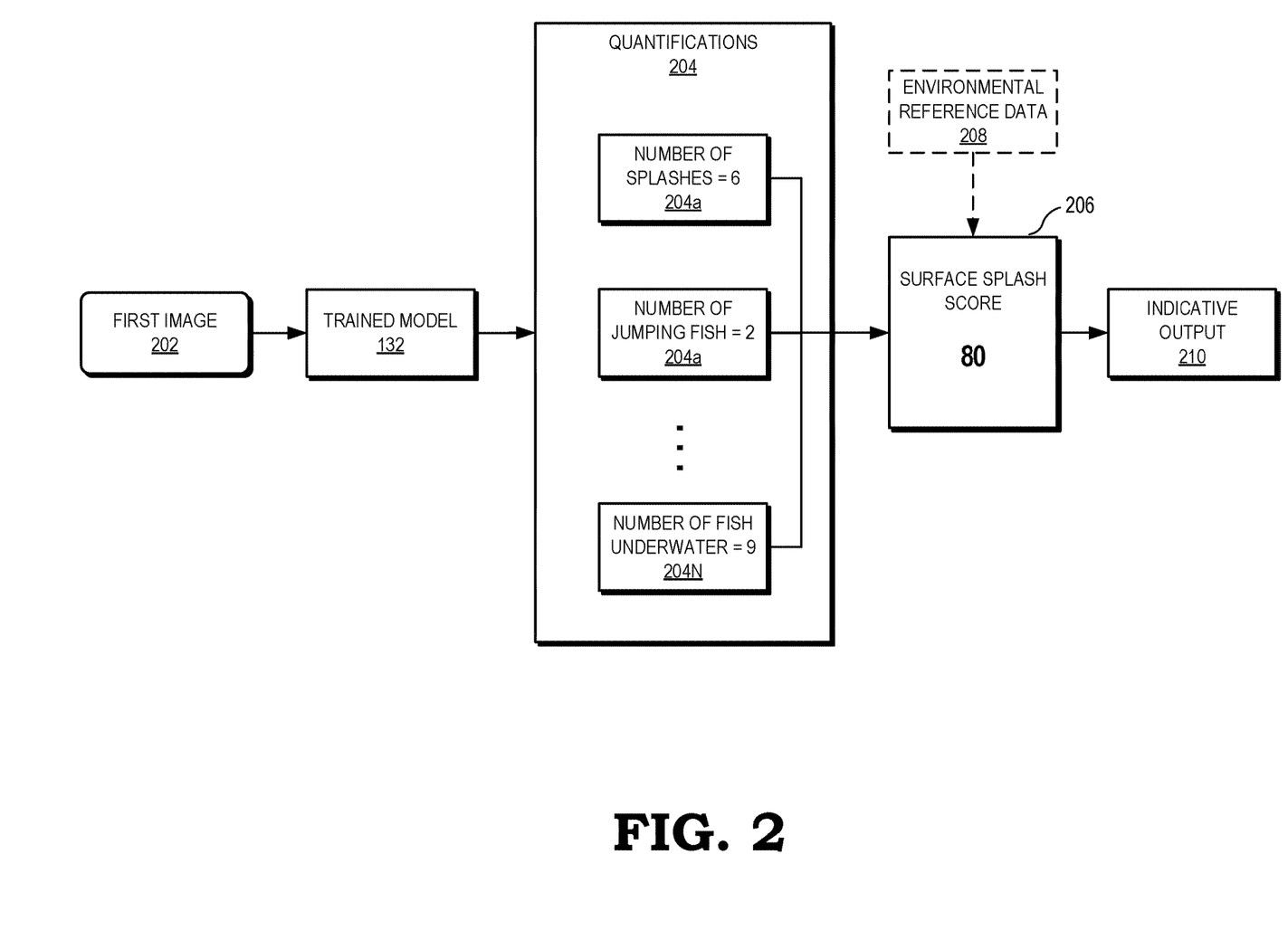
FIG. 2 is a block diagram illustrating an example of surface splash scoring in accordance with some embodiments.

FIG. 2 is a block diagram illustrating an example of surface splash scoring in accordance with some embodiments. In some embodiments, with respect to FIG. 2 and with continued reference to FIG. 1, a trained forecast model 132 receives one or more images (e.g., a first image 202) as input and generates one or more quantifications 204 associated with fish activity proximate the water surface. As shown in the embodiment of FIG. 2, the quantifications 204 includes a first quantification 204*a* representing a number of splashes (e.g., splashes 130 of FIG. 1) for a given period of time. Further, the quantifications 204 includes a second quantification 204*b* representing a number of jumping fish (e.g., fish 112 of FIG. 1) identified as breaking the water surface 106 for a given period of time. In various embodiments, such a given period of time may encompass a time period associated with a single image frame or over multiple image frames.

Although described here in the context of two different quantifications, those skilled in the art will recognize that the trained forecast model 132 (singularly or in combination with other forecast models) may generate any number N of different quantifications without departing from the scope of this disclosure. For example, in various embodiments, the quantifications 204 may further include a Nth quantification 204N representing any quantification of fish activity related to activity proximate the water surface. By way of non-limiting example, in various embodiments, the Nth quantification 204N may include, for example, a number of observable fish swimming under the water surface, a speed at which observable fish are swimming, a descriptor of fish schooling behavior, a descriptor of swimming patterns, and the like. As used herein, the term "quantification" generally refers to any measure of image features or feeding parameters represented within the data sets 108. For example, those skilled in the art will recognize that quantifications 204, in various embodiments, may include any value or descriptor of fish behavior and/or features that may be discerned from captured imagery.

As illustrated in the example of FIG. 2, the first quantification 204a generated by the trained forecast model 132 for a first image is the value '6'. That is, the trained forecast model 132 detects six splashes in the first image. Additionally, the second quantification 204b generated by the trained forecast model 132 for the same first image is the value '4'. That is, the trained forecast model 132 detects four fish jumping out of and at least partially above the water surface 106 in the first image. Based on the first quantification 204a and the second quantification 204b, the processing system 110 generates a surface splash score 206 with a value of '80' based on a one hundred points scale, which generally indicates a relatively high level of forecasted appetite (e.g., appetite decreases as the value of the surface splash score 206 approaches zero and increases as the value increases towards one hundred). In various embodiments, the surface splash score 206 is a numerical value or any other descriptor (such as previously described relative to providing a feeding appetite forecast) for which a relative comparison between differing surface splash scores may be performed.

Furthermore, in some embodiments, the sensor systems 102 generate sensor data (e.g., environmental data set 108b) including environmental data that may be optionally used as reference data 208 for implementing the surface splash scoring described herein. In some embodiments, the processing system 110 optionally (as indicated by the dotted lines) provides reference data 208 as a consideration in generating the surface splash score 206. It will be appreciated that various environmental factors or environmental conditions will impact fish behavior, and will therefore influence appetite-related activities and/or appetite itself. Information regarding such changes may be used for modifying operator feeding strategies, especially during adverse weather conditions.

It has been observed that fish behavior is not completely random. In the context of jumps, fish have a higher relative tendency to jump out of the water when illumination proximate the water surface 106 is brighter rather than dimmer. For example, jumping behavior is more frequent during daylight hours relative to nighttime hours. Similarly, jumping behavior is more frequent in summer months relative to winter and early spring months, during which the total amount of daily sunlight is decreased. Additionally, fish have a higher relative tendency to jump at higher water temperatures, whereas lower water temperatures generally have an inhibitory influence on activity levels. Accordingly, it will be appreciated that environmental parameters having such a direct correlation to surface activity may be utilized by the processing system 110 as the basis for modifying an expected baseline of activity and generating the surface splash score 206 in turn.

Additionally, it should be appreciated that various environmental parameters may also have an indirect correlation to surface activity. For example, dissolved oxygen saturation levels within the aquatic environment influences fish appetite. In particular, fish often begin to lose their appetite after dissolved oxygen saturation falls below a certain threshold (e.g., critical oxygen tension level). The lower dissolved oxygen saturation levels may not necessarily result in mortality or directly result in decreased physical activity levels but may have negative impacts on appetite, which in turn decreases surface activity levels. Accordingly, it will be appreciated that environmental parameters having such an indirect correlation to surface activity (including secondary-, tertiary-, and higher-order correlations) may be utilized by the processing system 110 as the basis for modifying an expected baseline of activity and generating the surface splash score 206 in turn.

A raw numerical value for the surface splash score 206 (e.g., having a value of '80' as shown in FIG. 2) provides information corresponding to forecasted fish appetite along a spectrum of possible hunger levels. To provide further context and information, in various embodiments, the processing system 110 generates an indicative output 210 corresponding to and based at least in part on the surface splash score 206 for aiding feeding operations, including but not limited to feeding instructions, user interface alerts, and the like. As will be appreciated, in various embodiments, users and operators may be capable of modifying their feeding strategy manually based on the indicative output 210. For example, in some embodiments, the operator may provide fewer feed pellets when the indicative output 210 provides a signal that appetite is low. In other embodiments, the indicative output 210 may be provided to an automatic feeder (e.g., feeding control system 136 of FIG. 1) for controlling feeding operations in a manner that reduces or eliminates manual, human intervention.

Referring now to FIG. 3, illustrated is an example graphical user interface (GUI) 300 for presenting information related to surface splash scores in accordance with some embodiments. In particular, FIG. 3 provides various examples of indicative outputs 210 that may be generated based on the surface splash score 206. It should be recognized that although illustrated in FIG. 3 as GUI representations for ease of illustration and description, the surface splash scores may be embodied in various formats and representations without departing from the scope of this disclosure.

As shown, the GUI 300 includes a display corresponding to one or more enclosures 302 at least partially positioned within and therefore imaged by the field of view of an imaging sensor (e.g., first sensor system 102a of FIG. 1). In particular, the GUI 300 includes the display of a first enclosure 302a having an outer diameter 304a that is wholly observable by the field of view of the imaging sensor. The GUI 300 further includes the display of a second enclosure 302b, a third enclosure 302c, a fourth enclosure 302d, and a fifth enclosure 302e that each having a portion of their outer diameters 304b, 304c, 304d, and 304e, respectively, observable by the field of view of the imaging sensor.

In some embodiments, and with respect to the first enclosure 302a, the GUI 300 displays a first indicative output 306a as represented by a raw surface splash score (e.g., surface splash score 206 of FIG. 2) with a value of '40' based on a one hundred point scale. The raw numerical value of '40' generally indicates a moderate level of forecasted appetite (e.g., appetite decreases as the value of the surface splash score approaches zero and increases as the value increases towards one hundred). In this manner, the raw numerical value of the first indicative output 306a provides information corresponding to forecasted fish appetite along a spectrum of possible hunger levels. It should be recognized that although described here in the context of a hunger spectrum along a one-hundred-point scale, any numerical scale (including integer-based and otherwise) may be utilized without departing from the scope of this disclosure. For example, in other embodiments, the indicative output 306a may similarly be represented by a raw surface splash score with a different unit scale (e.g., a second scale having ten points from 0.0-10.0).

Those skilled in the art will recognize that the example first indicative output 306a of FIG. 3 based on a scale having one hundred points from 0-100 is provided only for illustrative purposes to give a concrete example of the surface splash scoring operations discussed herein. However, any of a variety of unit scales and/or user interface schemes may be implemented for representing the aggregated appetite score. For example, in any of the exemplary systems disclosed here, color coding may be used to indicate categories of any parameter. For example, in the display of a user interface, color coding may be used to indicate whether a population of fish is predicted to be starving (e.g., with the color red), hungry (e.g., with the color yellow), or satiated (e.g., with the color green). Similarly, color coding may be used to indicate whether a feeder should, based on the aggregated appetite, stop feeding due to reaching satiation (e.g., with the color red), begin monitoring for signs of satiation (e.g., with the color yellow), or begin/continue feeding (e.g., with the color green).

In some embodiments, and with reference to the second enclosure 302b, the GUI 300 displays a second indicative output 306b as represented by the color 'GREEN' (which is illustrated in FIG. 3 and described here in textual terms for ease of illustration and description). The color 'GREEN' generally indicates a forecasted appetite of a sufficient level such that continued administration of feed is anticipated to be eaten. Accordingly, in some embodiments, the second indicative output 302b provides information to the user as actionable insight that may be used for starting feeding, continuing feeding, or increasing one or more of an amount, a rate, and/or an intensity of feeding. In other embodiments, the second indicative output 302b may be provided as instructions (e.g., to the feed controller system 136 of FIG. 1) for controlling the operations of an automatic feeder.

In some embodiments, and with reference to the third enclosure 302c, the GUI 300 displays a third indicative output 306c as represented by a textual instruction to 'STOP FEEDING'. The textual instruction to 'STOP FEEDING' generally indicates a low level of forecasted appetite such that additional administration of feed into the third enclosure 302 would go uneaten and therefore wasted. Accordingly, in some embodiments, the third indicative output 306c provides information visible to the user as actionable insight for guiding feeding operations. In other embodiments, the third indicative output 306c may be provided as instructions (e.g., to the feed controller system 136 of FIG. 1) for controlling the operations of an automatic feeder.

In some embodiments, and with reference to the fourth enclosure 302d, the GUI 300 displays a fourth indicative output 306d as represented by a feeding rate instruction with a value of '# of pellets per second'. In some embodiments, the fourth indicative output 306d may be provided as a GUI display to provide information visible to the user as actionable insight for guiding feeding operations. In other embodiments, the fourth indicative output 306d may be provided as instructions (e.g., to the feed controller system 136 of FIG. 1) for controlling the operations of an automatic feeder.

In some embodiments, and with reference to the fifth enclosure 302e, the GUI 300 displays a fifth indicative output 306e as represented by a warning signal. In some embodiments, the fifth enclosure 302e is provided as a GUI display to provide information visible to the user in response to the surface splash score 206 indicating an anticipated appetite that deviates from an expected baseline value for a given time period. For example, the fifth indicative output 306e provides information visible to the user in response to the surface splash score 206 indicating an anticipated appetite that is below an expected threshold based on, for example, environmental conditions and other feeding parameters. In various embodiments, the fifth indicative output 306e provides an alert that triggers an operator (e.g., human user) to take a closer look and determine reasons behind such a discrepancy between forecasted and expected appetite.

Figure 4:
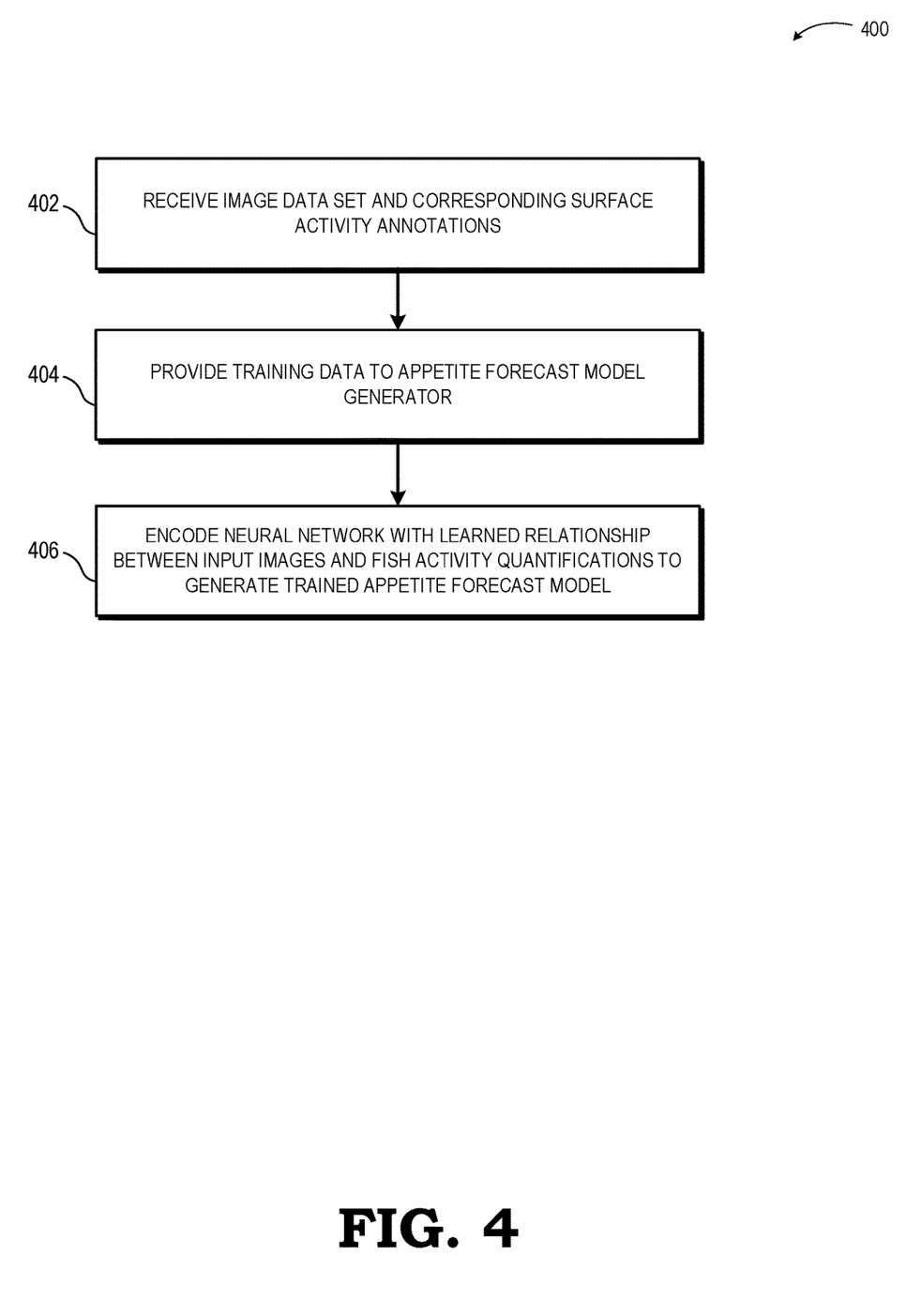
FIG. 4 is a flow diagram of a method for generating a trained appetite forecast model in accordance with some embodiments.

Referring now to FIG. 4, illustrated is a block diagram of a method 400 for generating a trained appetite forecast model in accordance with some embodiments. The method 400 begins at block 402 with a processing system (e.g., processing system 110 of FIG. 1) receiving image data (e.g., image data set 108a of FIG. 1). In some embodiments, the processing system also receives environmental data (e.g., environmental data set 108b of FIG. 1).

At block 404, the processing system provides at least the received image data (and optionally the environmental data) to an appetite forecast model generator. The appetite forecast model generator receives the image data as input to a convolutional neural network (CNN) including a plurality of convolutional layer(s), pooling layer(s), fully connected layer(s), and the like. It should be recognized that although FIG. 4 is described in the specific context of training a CNN network architecture, the method 400 may perform surface splash training using various neural network configurations without departing from the scope of this disclosure. By way of non-limiting examples, in various embodiments, the system may use neural network models such as AlexNet, VGG, ResNet, SqueezeNet, DenseNet, Inception, GoogLeNet, ShuffleNet, MobileNet, ResNeXt, Wide ResNet, MNASNet, and various other convolutional neural networks, recurrent neural networks, recursive neural networks, and various other neural network architectures.

At block 406, the CNN has access at training time to a plurality of images and training labels in the form of ground-truth annotations with respect to visible splashes, visible fish jumping out of water, and the like. Accurate image scene parsing is a crucial component for perception-related tasks in aquaculture. However, the variability of underwater objects and/or the environment will affect the accuracy of image-based measurements and accordingly the accuracy or reliability of any subsequent processes related to the image-based measurements (including human-based observations and assessments, machine-based processes which may consume the image data/image-based measurements as input, and the like). Accordingly, in various embodiments, image data (which in various embodiments includes at least a subset of image data captured by one or more cameras of the first image sensor system 102a) and environmental data (which in various embodiments includes at least a subset of environmental data captured by one or more environmental sensors of the second sensor system 102b) is provided as training data to generate trained models using machine learning techniques and neural networks.

In various embodiments, the training data includes various images of underwater objects (e.g., fish 112) that are annotated or otherwise labeled with label instances (e.g., bounding boxes, polygons, semantic segmentations, instance segmentations, and the like) that identify, for example, individual fish, splashes resulting from fish jumping, and various other identifiable features within imagery.

For example, the training data may include various images of views and/or various images of fish 112, such as images of fish having varying features and properties, such as fins, tails, shape, size, color, and the like. The training data may also include images with variations in the locations and orientations of fish within each image, including images of the fish captured at various camera viewing angles. Further, in various embodiments, the training data also includes contextual image data (e.g., provided as image metadata) indicating, for example, one or more of lighting conditions, temperature conditions, camera locations, topology of the determined area, current direction or strength, salinity levels, oxygen levels, fish activities, and timing data at the time an image was captured.

Image data is often inhomogeneous due to, for example, variations in the image acquisition conditions due to illumination conditions, different viewing angles, and the like, which can lead to very different image properties such that such that objects of the same class may look very different. For example, in some embodiments, image variations arise due to viewpoint variations in which a single instance of an object can be oriented in various positions with respect to the camera. In some embodiments, image variations arise due to scale variations because objects in visual classes often exhibit variation in their size (i.e., not only in terms of their extent within an image, but the size of objects in the real world). In other embodiments, image variations arise due to deformation as various objects in visual classes are not rigid bodies and can be deformed in various manners. Further, in various embodiments, occlusions occur as objects of interest become positioned in space behind other objects such that they are not within the field of view of a camera and only a portion of an object is captured as pixel data.

Due to one or more of the variations discussed above, the degree of self-similarity between objects may often be quite low (referred to herein as intra-image variability) even within a single image. Similarly, image variations may also occur between different images of one class (referred to herein as intra-class variability). It is desirable to minimize intra-class variability as we want two objects of the same class to look quantitatively similar to a deep learning model. Further, in the context of underwater objects including the population of fish 112, it is desirable to increase inter-class variability such that images containing different species of fish to look different to a trained model, since they are in different categories/classes even though they are still fish.

In various embodiments, the image training data utilizes prior data (referred to herein as metadata) to aid in object classification and image segmentation by correlating some of the observed intra-class variations for aiding discriminative object detection and classification. The metadata is orthogonal to the image data and helps address some of the variability issues mentioned above by utilizing extrinsic information, including metadata corresponding to intra-class variations, to produce more accurate classification results. Further, in some embodiments, the image training data may utilize image-level labels, such as for weakly supervised segmentation and determining correspondence between image-level labels and pixels of an image frame.

In various embodiments, metadata includes data corresponding to a pose of the first image sensor system 102*a* within the marine enclosure 134, such as with respect to its orientation, location, and depth with respect to the marine enclosure. In some embodiments, metadata includes illumination condition information such as time of day and sun position information which may be used to provide illumination incidence angle information. Further, in some embodiments, the training data also includes metadata corresponding to human tagging of individual image frames that provide an indication as to whether an image frame meets a predetermined minimum quality threshold for one or more intended use cases. Such metadata allows trained models to capture one or more aspects of intra-class variations. It should be recognized that although specific examples of metadata are mentioned herein for illustrative purposes, various metadata may be utilized during model training for the systems described herein without departing from the scope of this disclosure.

In some embodiments, machine learning classifiers are used to categorize observations in the training image data. For example, in various embodiments, such classifiers generate outputs including one or more labels corresponding to detected objects. In various embodiments, the classifiers determines class labels for objects in image data including, for example, a species of fish, a swimming pattern of a school of fish, a size of each fish, a location of each fish, estimated illumination levels, a type of activity that objects are engaged in, identified jumps, splashes at the water surface, and the like. Classifiers may also determine an angle of a fish's body relative to a camera and/or identify specific body parts (e.g., deformable objects such as fish bodies are associated with a constellation of body parts), and at least a portion of each object may be partially occluded in the field of view of the camera.

In some embodiments, a classifier includes utilizing a Faster recurrent convolutional neural network (R-CNN) to generate a class label output and bounding box coordinates for each detected underwater object in an image. In other embodiments, a classifier includes utilizing a Mask R-CNN as an extension of the Faster R-CNN object detection architecture that additionally outputs an object mask (e.g., an output segmentation map) for detected objects in an image and classifies each and every pixel within an image. In some embodiments, classifiers are utilized when image training data does not include any labeling or metadata to provide ground truth annotations. In other embodiments, classifiers are utilized to provide additional context or dimensionality to labeled data.

In various embodiments, machine learning techniques may be used to determine various relationships between training images and the contextual image data to learn or identify relationships (e.g., as embodied in the trained models) between image data and desired model outputs. In various embodiments, the CNN learns a relationship (e.g., translation) between camera images and ground-truth annotations. In this manner, at block 406, appetite forecast model generator learns the relationship between input images and the corresponding one or more quantifications 204 associated with fish activity proximate the water surface, as embodied in an output function representing a trained appetite forecast model (e.g., appetite forecast model 132 of FIG. 1). Additionally, in some embodiments, the CNN learns to estimate a distribution of fish within the marine enclosure as a function of the corresponding one or more quantifications 204 associated with fish activity proximate the water surface (e.g., based on the one or more quantifications 204 being less than a predetermined threshold, a certain total fish biomass within the marine enclosure is predicted to be swimming at certain depths).

Figure 5:
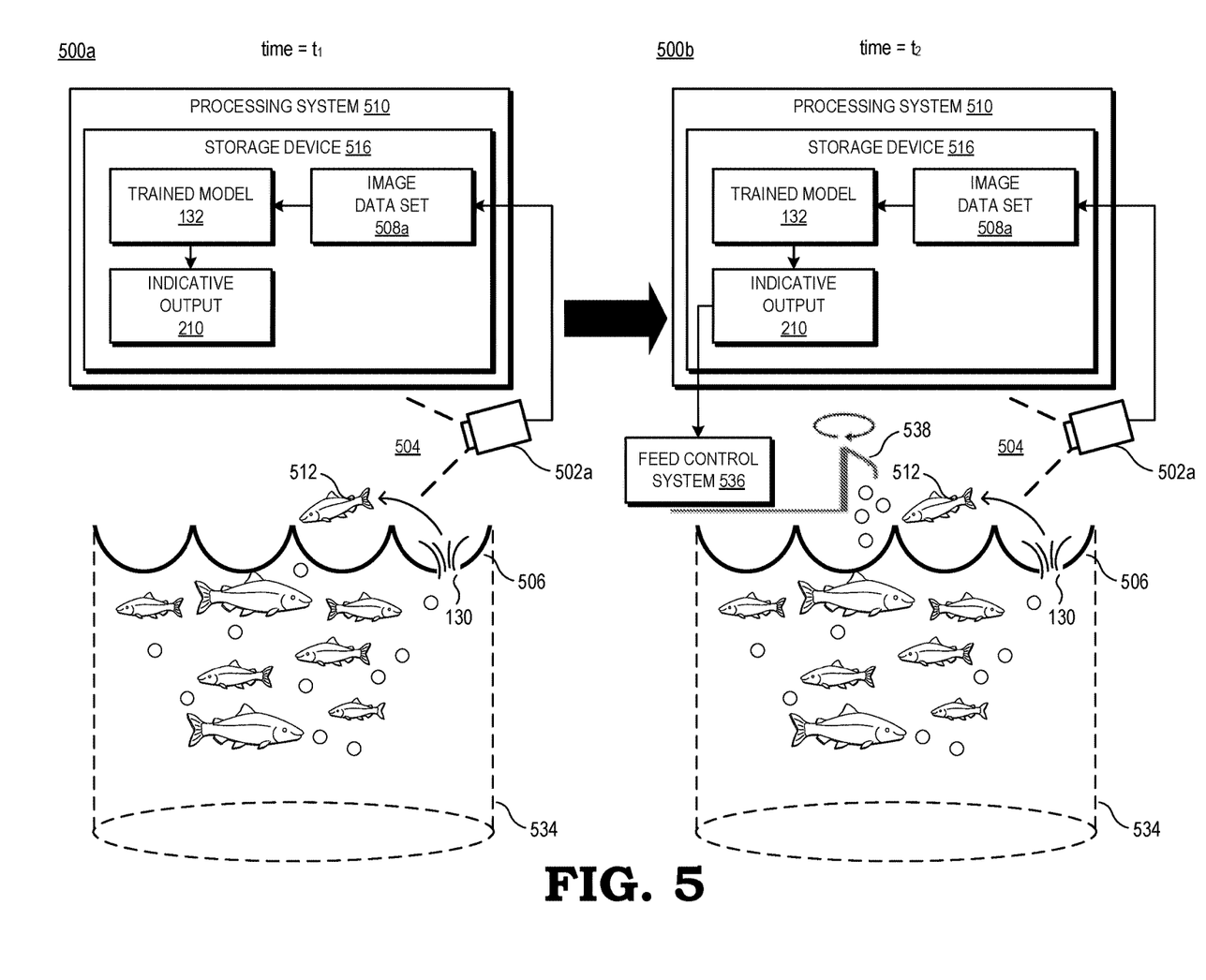
FIG. 5 is a diagram illustrating a method of dynamic feeding control based on surface splash scoring in accordance with some embodiments.

For context purposes, with respect to FIG. 5 and with continued reference to FIGS. 1-4, illustrated is a diagram illustrating an example method of dynamic feeding control based on surface splash scoring in accordance with some embodiments. As illustrated in the two panel views 500*a* and

500b, a first image sensor system 502a is positioned at or above the water surface 506 for monitoring the environment 504 proximate to and above the water surface 506 (e.g., at the water surface or even slightly underwater if the image sensors are capable of capturing sub-subsurface details). Although the first image sensor system 502a is shown in FIG. 5 to be positioned above the water surface 506, those skilled in the art will recognize that, in various embodiments, the sensor systems utilized herein are not limited to above-water sensors and may include combinations of a plurality of sensors at different locations. It should also be recognized that, in various embodiments, the sensor systems utilized herein are not limited to sensors of differing parameter types. For example, in various embodiments, the sensor systems may include two different image-data based sensor systems positioned at different locations (e.g., under water and above water) and/or a plurality of differing environmental sensors.

The one or more imaging sensors of the first image sensor system 502a are directed towards the surrounding environment 504 (e.g., facing the water surface 506), with each imaging sensor capturing a sequence of images (e.g., video frames) of the environment 504 and any objects in the environment. In various embodiments, the one or more imaging sensors monitor an individual fish, multiple fish, or an entire population of fish proximate to the water surface 506. Such image data measurements may, for example, be used to identify movement of one or more fish, orientation of one or more fish, swimming pattern or swimming behavior of one or more fish, jumping pattern or jumping behavior of one or more fish, splashes at the water surface resulting from behavior of one or more fish, any activity or behavior of one or more fish, and the like.

As illustrated in panel view 500a, the fish 512 are positioned within the marine enclosure 534 at a first time period $t_1$. In panel view 500a, the one or more imaging sensors of the first image sensor system 502a are configured to be deployed in a production environment where the first image sensor system 502a generates and transmits a stream of image data 508a to processing system 510. In various embodiments, the processing system 510 runs inference (e.g., execution phase implementation of trained model 532) in real time, yielding surface splash scores 206 and/or indicative output 210 either directly used as the end result or further fed into downstream systems.

For context purposes, in some embodiments, the trained model 532 receives image data 508a at panel view 500a and generates an indicative output 210 corresponding to and based at least in part on the surface splash score 206 (of FIG. 2). As illustrated in panel view 500b for a second time period $t_2$, the processing system 510 provides the indicative output 210 generated to a feeding control system 536. As referenced above, various indicative outputs 210 may be generated based on surface splash scores 206. In some embodiments, as shown, the feeding control system 536 instructs a feed source 538 to dispense feed into the marine enclosure 534 based at least in part on the surface splash score 206 indicating a sufficient level of hunger (such as previously discussed in more detail with respect to FIGS. 2 and 3).

Figure 6:
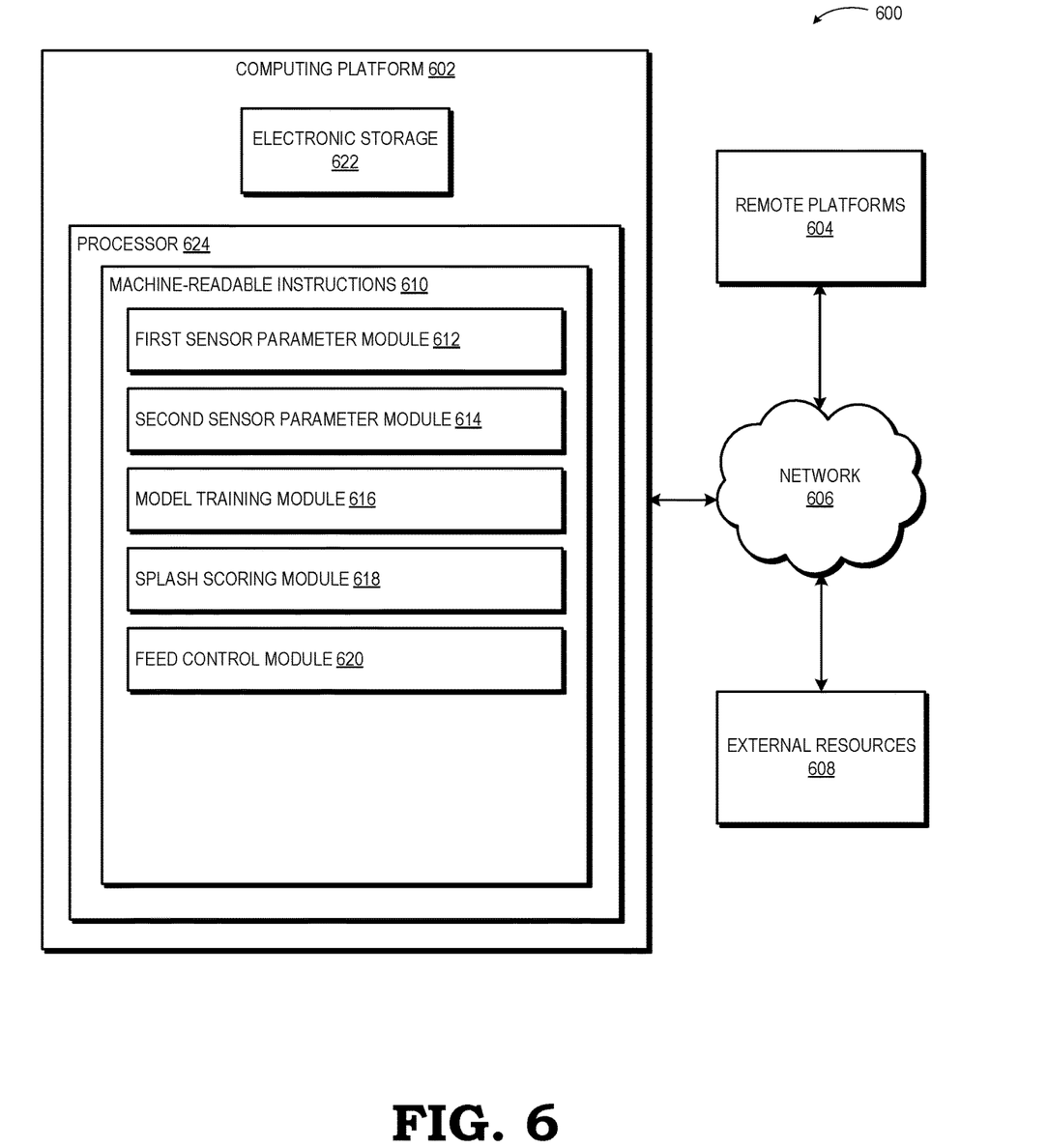
FIG. 6 is a block diagram illustrating a system for implementing automated feeding based on surface splash scoring in accordance with some embodiments.

FIG. 6 is a block diagram illustrating a system 600 configured to implement automated feeding based on surface splash scoring in accordance with some embodiments. In some embodiments, the system 600 includes one or more computing platforms 602. The computing platform(s) 602 may be configured to communicate with one or more remote platforms 604 according to a client/server architecture, a peer-to-peer architecture, and/or other architectures via a network 606. Remote platform(s) 604 may be configured to communicate with other remote platforms via computing platform(s) 602 and/or according to a client/server architecture, a peer-to-peer architecture, and/or other architectures via the network 606. Users may access system 600 via remote platform(s) 604. A given remote platform 604 may include one or more processors configured to execute computer program modules.

The computer program modules may be configured to enable an expert or user associated with the given remote platform 604 to interface with system 600 and/or one or more external resource(s) 608, and/or provide other functionality attributed herein to remote platform(s) 604. By way of non-limiting example, a given remote platform 604 and/or a given computing platform 602 may include one or more of a server, a desktop computer, a laptop computer, a handheld computer, a tablet computing platform, a NetBook, a Smartphone, a gaming console, and/or other computing platforms.

In some implementations, the computing platform(s) 602, remote platform(s) 604, and/or one or more external resource(s) 606 may be operatively linked via one or more electronic communication links. For example, such electronic communication links may be established, at least in part, via a network 606 such as the Internet and/or other networks. It will be appreciated that this is not intended to be limiting, and that the scope of this disclosure includes implementations in which computing platform(s) 602, remote platform(s) 604, and/or one or more external resource(s) 608 may be operatively linked via some other communication media. External resource(s) 608 may include sources of information outside of system 600, external entities participating with system 600, and/or other resources. In some implementations, some or all of the functionality attributed herein to external resources 608 may be provided by resources included in system 600.

In various embodiments, the computing platform(s) 602 are configured by machine-readable instructions 610 including one or more instruction modules. In some embodiments, the instruction modules include computer program modules for implementing the various operations discussed herein (such as the operations previously discussed with respect to FIGS. 1-5).

For purposes of reference, the instruction modules include one or more of a first sensor parameter module 612, a second sensor parameter module 614, a model training module 616, a splash scoring module 618, and a sensor control module 620. Each of these modules may be implemented as one or more separate software programs, or one or more of these modules may be implemented in the same software program or set of software programs. Moreover, while referenced as separate modules based on their overall functionality, it will be appreciated that the functionality ascribed to any given model may be distributed over more than one software program. For example, one software program may handle a subset of the functionality of the first sensor parameter module 612 while another software program handles another subset of the functionality of the second sensor parameter module 614.

In various embodiments, the first sensor parameter module 612 generally represents executable instructions configured to receive a first sensor data set. With reference to FIGS. 1-5, in various embodiments, the first sensor parameter module 612 receives sensor data including the first sensor data set via a wireless or wired communications link for storage, further processing, and/or distribution to other modules of the system 600. For example, in the context of FIGS. 1-2, the sensor system 102 communicate at least the first image data set 108a including image data representing any image-related value or other measurable factor/characteristic that is representative of at least a portion of a data set that describes the presence (or absence), abundance, distribution, size, and/or behavior of underwater objects (e.g., a population of fish 112 as illustrated in FIG. 1). In particular, the first sensor parameter module 612 receives image data measurements from monitoring an individual fish, multiple fish, or an entire population of fish proximate to the water surface 106, for example, to identify movement of one or more fish, orientation of one or more fish, swimming pattern or swimming behavior of one or more fish, jumping pattern or jumping behavior of one or more fish, splashes at the water surface resulting from behavior of one or more fish, any activity or behavior of one or more fish, and the like.

In various embodiments, the second sensor parameter module 614 generally represents executable instructions configured to receive a second sensor parameter data set. With reference to FIGS. 1-5, in various embodiments, the second sensor parameter module 614 receives sensor data including the second sensor parameter data set via a wireless or wired communications link for storage, further processing, and/or distribution to other modules of the system 600. For example, in the context of FIGS. 1 and 2, the sensor systems 102b communicate at least the environmental data set 108b including environmental data indicating environmental conditions such as, for example, an ambient light level, an amount of dissolved oxygen in water, a direction of current, a strength of current, a salinity level, a water turbidity, a topology of a location, a weather forecast, and any other value or measurable factor/characteristic that is representative of environmental conditions proximate to the marine enclosures 134.

In various embodiments, the model training module 616 generally represents executable instructions configured to receive at least a subset of the first sensor parameter data set from the sensor parameter module 612 and generate a trained model for a first use case. With reference to FIGS. 1-5, in various embodiments, the model training module 616 receives one or more data sets embodying parameters related to underwater object parameters and environmental parameters that may influence the accuracy of sensor system operations. For example, in the context of FIGS. 1-2, the model training module 616 receives one or more of more data sets 108 (e.g., image data set 108a and optionally environmental data set 108b) and applies various machine learning techniques to determine various relationships between training images and the contextual image data to learn or identify relationships (e.g., as embodied in the trained models 132) between image data and one or more quantifications 204 associated with fish activity proximate the water surface. For example, such learned relationships may include a learned function between surface-level activity caused by underwater object parameters (e.g., physical location of fish, splashes caused by fish jumping, and the like such as represented within image data set 108a), one or more image labels/annotations, image metadata, and other contextual image data to one or more quantifications 204.

In various embodiments, a surface splash scoring module 618 generally represents executable instructions configured to receive at least at least a subset of the first sensor parameter data set from the first sensor parameter module 612 and perform execution phase implementation of the trained appetite forecast model generated by model training module 616. With reference to FIGS. 1-5, in various embodiments, the surface splash scoring module 618 receives one or more data sets embodying parameters related to underwater object parameters and environmental parameters that may influence the accuracy of sensor system operations. For example, the surface splash scoring module 618 receives one or more of more data sets 108 (e.g., image data set 108a and optionally environmental data set 108b) and generates a surface splash score 206. In some embodiments, the surface splash scoring module 618 also utilizes environmental data set 108b as reference data as a consideration in generating the surface splash score 206. It will be appreciated that various environmental factors or environmental conditions will impact fish behavior, and will therefore influence appetite-related activities and/or appetite itself. Information regarding such changes may be used for modifying operator feeding strategies, especially during adverse weather conditions. In various embodiments, the surface splash scoring module 618 further generates one or more indicative outputs 210 corresponding to and based at least in part on the surface splash score 206 for aiding feeding operations, including but not limited to feeding instructions, user interface alerts, and the like (and as previously discussed in more detail with respect to FIG. 3).

The system 700 also includes an electronic storage 722 including non-transitory storage media that electronically stores information. The electronic storage media of electronic storage 722 may include one or both of system storage that is provided integrally (i.e., substantially non-removable) with computing platform(s) 702 and/or removable storage that is removably connectable to computing platform(s) 702 via, for example, a port (e.g., a USB port, a firewire port, etc.) or a drive (e.g., a disk drive, etc.). Electronic storage 722 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 722 may include one or more virtual storage resources (e.g., cloud storage, a virtual private network, and/or other virtual storage resources). Electronic storage 722 may store software algorithms, information determined by processor(s) 724, information received from computing platform(s) 702, information received from remote platform(s) 704, and/or other information that enables computing platform(s) 702 to function as described herein.

Processor(s) 724 may be configured to provide information processing capabilities in computing platform(s) 702. As such, processor(s) 724 may include one or more of a digital processor, an analog processor, a digital circuit designed to process information, an analog circuit designed to process information, a state machine, and/or other mechanisms for electronically processing information. Although processor(s) 724 is shown in FIG. 7 as a single entity, this is for illustrative purposes only. In some implementations, processor(s) 724 may include a plurality of processing units. These processing units may be physically located within the same device, or processor(s) 724 may represent processing functionality of a plurality of devices operating in coordination. Processor(s) 724 may be configured to execute modules 712, 714, 716, 718, and/or 720, and/or other modules. Processor(s) 724 may be configured to execute modules 712, 714, 716, 718, and/or 720, and/or other modules by software; hardware; firmware; some combination of software, hardware, and/or firmware; and/or other mechanisms for configuring processing capabilities on processor(s) 724. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 712, 714, 716, 718, and/or 720 are illustrated in FIG. 7 as being implemented within a single processing unit, in implementations in which processor(s) 724 includes multiple processing units, one or more of modules 712, 714, 716, 718, and/or 720 may be implemented remotely from the other modules. The description of the functionality provided by the different modules 712, 714, 716, 718, and/or 720 described below is for illustrative purposes, and is not intended to be limiting, as any of modules 712, 714, 716, 718, and/or 720 may provide more or less functionality than is described. For example, one or more of modules 712, 714, 716, 718, and/or 720 may be eliminated, and some or all of its functionality may be provided by other ones of modules 712, 714, 716, 718, and/or 720. As another example, processor(s) 724 may be configured to execute one or more additional modules that may perform some or all of the functionality attributed below to one of modules 712, 714, 716, 718, and/or 720.

As will be appreciated, in various embodiments, users and operators may be capable of modifying their feeding strategy manually based on the indicative output 210. For example, in some embodiments, the operator may provide fewer feed pellets when the indicative output 210 provides a signal that appetite is low. In other embodiments, the indicative output 210 may be provided to an automatic feeder (e.g., feeding control system 136 of FIG. 1) for controlling feeding operations in a manner that reduces or eliminates manual, human intervention. In various embodiments, a feed control module 620 generally represents executable instructions configured to receive at least the indicative output from the surface splash scoring module 618 and provides instructions to control feeding operations. For example, in the context of FIG. 5, the feeding control system 536 instructs a feed source 538 to dispense feed into the marine enclosure 534 based at least in part on the surface splash score 206 and/or indicative output 210 indicating a sufficient level of hunger (such as previously discussed in more detail with respect to FIGS. 2 and 3).

Accordingly, as discussed herein, FIGS. 1-6 describe techniques that improve the precision and accuracy of feeding appetite forecasting and decreasing the uncertainties associated with conventional appetite prediction systems by utilizing image sensor systems to monitor fish behavior, such as to identify hunger levels and determine behavior during feeding. Further, the techniques described here provide an efficient manner for farmers to generate one or more quantifications associated with observable fish activity as appetite proxies to improve feeding and the results of aquaculture operations. In this manner, surface splash scoring enables more efficient scheduling of feeding times and/or quantity of feed in order to minimize waste while also increasing growth rates by feeding when activity levels indicate hunger and willingness to consume feed. Further, analysis of fish splash behavior prior to feeding allows determination of when to start and/or stop feeding without human input and/or reduces error resulting from differential human, experiential-based assessments of hunger. Although discussed here in the context of surface splash scoring for appetite scoring, it should be recognized that other parameters may also be modeled. For example, surface splash detection may similarly be applied to quantification of stress-related behavior or disease-related behavior instead of appetite-related behaviors as discussed herein.

In some embodiments, certain aspects of the techniques described above may implemented by one or more processors of a processing system executing software. The software includes one or more sets of executable instructions stored or otherwise tangibly embodied on a non-transitory computer readable storage medium. A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments, meaning that the particular feature, function, structure, or characteristic being described is included in at least one embodiment of the techniques and concepts discussed herein. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Further, although the concepts have been described herein with reference to various embodiments, references to embodiments do not necessarily all refer to the same embodiment. Similarly, the embodiments referred to herein also are not necessarily mutually exclusive.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   receiving, at an electronic device, a set of camera frames corresponding to images of a water surface;
   receiving, at the electronic device, an environmental data set corresponding to a first set of environment conditions aligned in time with capture of the set of camera frames;
   processing, by the electronic device, the set of camera frames with a trained machine learning model for generating one or more quantifications associated with fish activity proximate the water surface;
   computing, based at least in part on the one or more quantifications, a surface splash score representing an appetite level anticipated to be exhibited for a future time period, wherein the surface splash score is modified based on the environmental data set differing from a second set of environment conditions associated with generating the trained machine learning model; and
   generating, by the electronic device, an output indicative of the surface splash score.

2. The method of claim 1, wherein generating one or more quantifications associated with fish activity further comprises:
   generating at least one of a detected splash count and a detected fish count.

3. The method of claim 1, further comprising:
   normalizing, based at least in part on one of a surface area imaged by each of the set of camera frames and an estimated population number of fish within an enclosure associated with the water surface, the one or more quantifications to a predetermined scale for generating one or more normalized quantifications.

4. The method of claim 3, further comprising:
   determining a recommended level of feed to provide to the enclosure based at least in part on the one or more normalized quantifications and the surface splash score.

5. The method of claim 1, generating the output further comprises:
   generating, based at least in part on the surface splash score, a feeding instruction specifying an amount of feed to provide.

6. The method of claim 5, further comprising:
   providing the feeding instruction to guide operations of a feed controller system.

7. The method of claim 1, further comprising:
   estimating, based at least in part on the one or more quantifications and the surface splash score being less than a predetermined threshold, a distribution of fish within an enclosure associated with the water surface.

8. The method of claim 1, further comprising:
   generating, by the electronic device, an alert based on the surface splash score deviating from an expected baseline value for the future time period.

9. A system, comprising:
   a set of one or more imaging sensors configured to capture a set of camera frames of a water surface;
   a set of one or more environmental sensors configured to generate an environmental data set corresponding to a first set of environment conditions aligned in time with capture of the set of camera frames;
   a processor configured to:
      process the set of camera frames and the environmental data set with a trained machine learning model for generating one or more quantifications associated with fish activity at the water surface;
      compute, based at least in part on the one or more quantifications, a surface splash score representing an appetite level anticipated to be exhibited for a future time period, wherein the surface splash score is modified based on the environmental data set differing from a second set of environment conditions associated with generating the trained machine learning model; and
      generate an output indicative of the surface splash score.

10. The system of claim 9, wherein the processor is further configured to:
    generate at least one of a detected splash count and a detected fish count.

11. The system of claim 9, wherein the processor is further configured to:
    normalize, based at least in part on one of a surface area imaged by each of the set of camera frames and an estimated population number of fish within an enclosure associated with the water surface, the one or more quantifications to a predetermined scale for generating one or more normalized quantifications.

12. The system of claim 11, wherein the processor is further configured to:
    determine a recommended level of feed to provide to the enclosure based at least in part on the one or more normalized quantifications and the surface splash score.

13. The system of claim 9, wherein the processor is further configured to:
    generate, based at least in part on the surface splash score, a feeding instruction specifying an amount of feed to provide.

14. The system of claim 13, further comprising:
    a feed controller system configured to receive the feeding instruction as input for guiding feeding operations.

15. The system of claim 9, wherein the processor is further configured to:
    generate an alert based on the surface splash score deviating from an expected baseline value for the future time period.

16. A non-transitory computer readable medium embodying a set of executable instructions, the set of executable instructions to manipulate at least one processor to:
    receive a set of camera frames corresponding to images of a water surface;
    receive an environmental data set corresponding to a first set of environment conditions aligned in time with capture of the set of camera frames;
    process the set of camera frames with a trained machine learning model for generating one or more quantifications associated with fish activity at the water surface;

compute, based at least in part on the one or more quantifications, a surface splash score representing an appetite level anticipated to be exhibited for a future time period, wherein the surface splash score is modified based on the environmental data set differing from a second set of environment conditions associated with generating the trained machine learning model; and generating an output indicative of the surface splash score.

17. The non-transitory computer readable medium of claim 16, further embodying executable instructions to manipulate at least one processor to:

generate at least one of a detected splash count and a detected fish count.

18. The non-transitory computer readable medium of claim 16, further embodying executable instructions to manipulate at least one processor to:

generate, based at least in part on the surface splash score, a feeding instruction specifying an amount of feed to provide.

19. The non-transitory computer readable medium of claim 18, further embodying executable instructions to manipulate at least one processor to:

provide the feeding instruction to guide operations of a feed controller system.

20. The non-transitory computer readable medium of claim 16, further embodying executable instructions to manipulate at least one processor to:

generate an alert based on the surface splash score deviating from an expected baseline value for the future time period.

* * * * *